United States Patent
Cadez et al.

(10) Patent No.: US 7,454,705 B2
(45) Date of Patent: *Nov. 18, 2008

(54) CLUSTER-BASED VISUALIZATION OF USER TRAFFIC ON AN INTERNET SITE

(75) Inventors: Igor Cadez, Irvine, CA (US); David E. Heckerman, Bellevue, WA (US); Christopher A. Meek, Kirkland, WA (US); Steven J. White, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 761 days.

This patent is subject to a terminal disclaimer.

(21) Appl. No.: 10/829,548

(22) Filed: Apr. 22, 2004

(65) Prior Publication Data

US 2004/0196311 A1 Oct. 7, 2004

Related U.S. Application Data

(63) Continuation of application No. 09/517,462, filed on Mar. 2, 2000, now Pat. No. 6,771,289.

(51) Int. Cl.
*G06F 3/00* (2006.01)
*G06F 15/173* (2006.01)
*G06F 7/00* (2006.01)

(52) U.S. Cl. .................. 715/700; 709/224; 707/7
(58) Field of Classification Search ............... 709/224; 707/7; 715/700
See application file for complete search history.

(56) References Cited

U.S. PATENT DOCUMENTS

| | | | | |
|---|---|---|---|---|
| 5,931,912 A | * | 8/1999 | Wu et al. | 709/224 |
| 5,937,163 A | * | 8/1999 | Lee et al. | 709/218 |
| 5,974,396 A | * | 10/1999 | Anderson et al. | 705/10 |
| 6,112,238 A | * | 8/2000 | Boyd et al. | 709/224 |
| 6,317,787 B1 | * | 11/2001 | Boyd et al. | 709/224 |
| 6,393,479 B1 | * | 5/2002 | Glommen et al. | 709/224 |
| 6,400,381 B1 | | 6/2002 | Barrett et al. | |
| 6,424,971 B1 | * | 7/2002 | Kreulen et al. | 707/7 |
| 6,466,970 B1 | * | 10/2002 | Lee et al. | 709/217 |
| 6,470,383 B1 | * | 10/2002 | Leshem et al. | 709/223 |

(Continued)

OTHER PUBLICATIONS

Wu et al., SpeedTracer: A Web usage mining and analysis tool, 1998, IBM, IBM Systems Journal vol. 37 No. 1, 89-105.*

(Continued)

*Primary Examiner*—Dennis-Doon Chow
*Assistant Examiner*—Nicholas S Ulrich
(74) *Attorney, Agent, or Firm*—Amin, Turocy & Calvin, LLP

(57) ABSTRACT

Visualizing Internet web traffic is disclosed. In one embodiment, a number of windows are displayed, corresponding to a number of clusters into which users have been partitioned based on similar web browsing behavior. The windows are ordered from the cluster having the greatest number of users to the cluster having the least number of users. Each window has one or more rows, where each row corresponds to a user within the cluster. Each row has an ordered number of visible units, such as blocks, where each block corresponds to a web page visited by the user. The blocks can be color coded by the type of web page they represent. In one embodiment, the corresponding cluster models for the clusters are alternatively displayed in the windows.

25 Claims, 6 Drawing Sheets

U.S. PATENT DOCUMENTS

| | | | |
|---|---|---|---|
| 6,499,034 B1 * | 12/2002 | Mackinlay | 707/102 |
| 6,505,201 B1 * | 1/2003 | Haitsuka et al. | 707/10 |
| 6,546,393 B1 | 4/2003 | Khan | |
| 6,598,054 B2 | 7/2003 | Schuetze et al. | |
| 6,714,931 B1 * | 3/2004 | Papierniak et al. | 707/10 |
| 6,757,724 B1 * | 6/2004 | Fields et al. | 709/223 |
| 6,792,458 B1 * | 9/2004 | Muret et al. | 709/224 |
| 6,839,680 B1 * | 1/2005 | Liu et al. | 705/10 |
| 6,925,442 B1 * | 8/2005 | Shapira et al. | 705/10 |
| 6,993,590 B1 * | 1/2006 | Gauthier et al. | 709/231 |

OTHER PUBLICATIONS

Srivastava et al., Web Usage Mining: Discovery and Applications of Usage Patterns from Web Data, Jan. 2000, SIGKDD Explorations vol. 1, Issue 2, 12-23.*

* cited by examiner

FIG 2
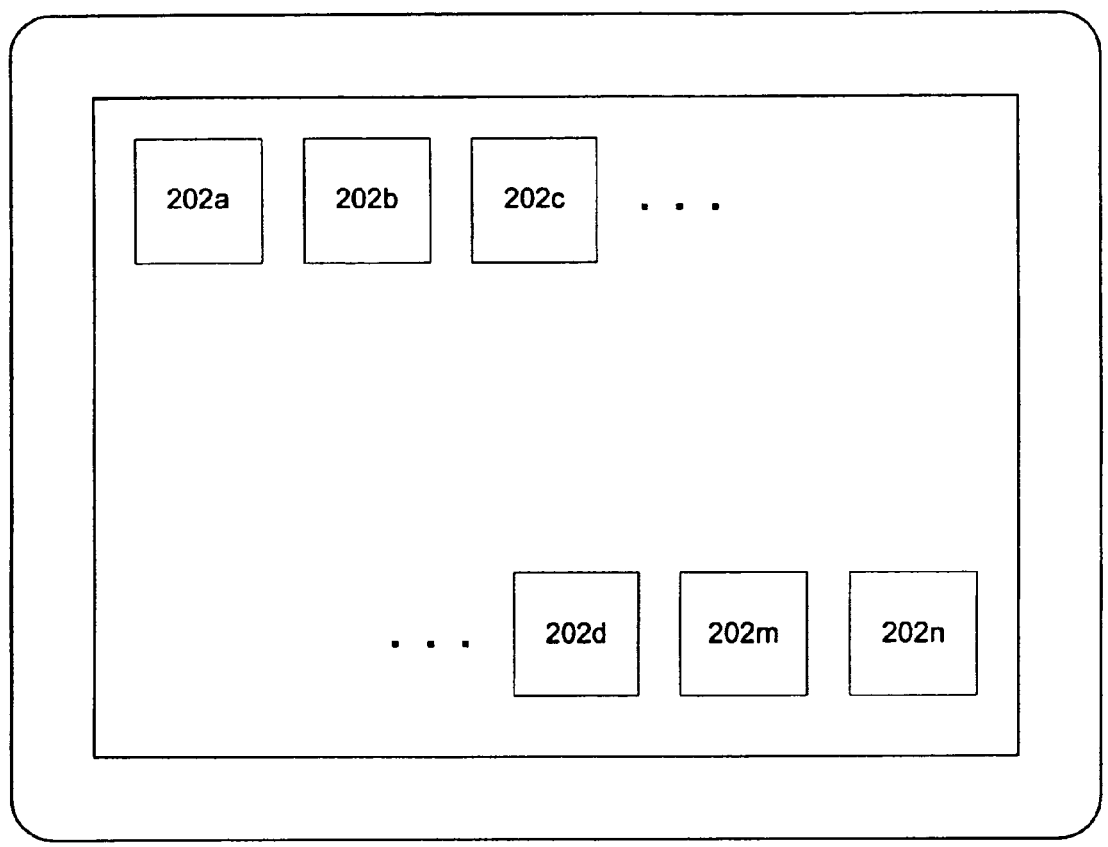

CLUSTER-BASED VISUALIZATION OF USER TRAFFIC ON AN INTERNET SITE

CROSS-REFERENCE TO RELATED APPLICATIONS

This application is a continuation of U.S. patent application Ser. No. 09/517,462, filed on Mar. 2, 2000, entitled "CLUSTER-BASED VISUALIZATION OF USER TRAFFIC ON AN INTERNET SITE", the entirety of which is incorporated herein by reference.

FIELD OF THE INVENTION

This invention relates generally to visualizing traffic on Internet world-wide-web sites, and more particularly to such visualization that is cluster-based in nature.

BACKGROUND OF THE INVENTION

Browsing the Internet has become an exceedingly popular application for computers and computer-like devices. In particular, sites on the world-wide-web (WWW, or web) have seen increasing visitation. A web site includes a number of web pages, identified by Uniform Resource Locator (URL) addresses. For example, a home page of a web site may be addressed as http://www.mypage.com/index.html.

As web sites have become more popular, tracking their usage has becoming important, especially for commercial sites. Operators of web sites, for example, are interested in determining how users proceed through the site in a single session. A session is when a user views one or more pages of the web site, in a particular order, before going to a different web site. By being able to determine how users are proceeding through their sites, operators are able to better understand their users, and how to make their web sites better.

For this and other reasons, therefore, there is a need for the present invention.

SUMMARY OF THE INVENTION

The invention relates to visualizing web traffic in a cluster-based manner. In one embodiment, a number of windows are displayed, corresponding to a number of clusters into which users have been partitioned based on similar web browsing behavior. The windows are ordered from the cluster having the greatest number of users to the cluster having the least number of users. Each window has one or more rows, where each row corresponds to a user within the cluster. Each row has an ordered number of visible units, such as blocks, where each block corresponds to a web page visited by the user. The blocks can be color coded by the type of web page they represent. In one embodiment, the corresponding cluster models for the clusters are alternatively displayed in the windows. The windows desirably can be made larger or smaller, as well as be scrolled through via scroll bars.

Thus, embodiments of the invention allow web site operators to view first-hand how users are visiting their web sites. The visual approach of embodiments of the invention provides for advantages as compared to non-visual approaches, since usage data for web sites can be increasingly large. Without a visual approach, for instance, it is more difficult for operators to make conclusions as to usage of their web sites, as compared to using a visual approach.

The invention includes computer-implemented methods, machine-readable media, computerized systems, and computers of varying scopes. Other aspects, embodiments and advantages of the invention, beyond those described here, will become apparent by reading the detailed description and with reference to the drawings.

BRIEF DESCRIPTION OF THE DRAWINGS

FIG. 2 is a diagram of a display device on which a number of windows can be shown in accordance with an embodiment of the invention;

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
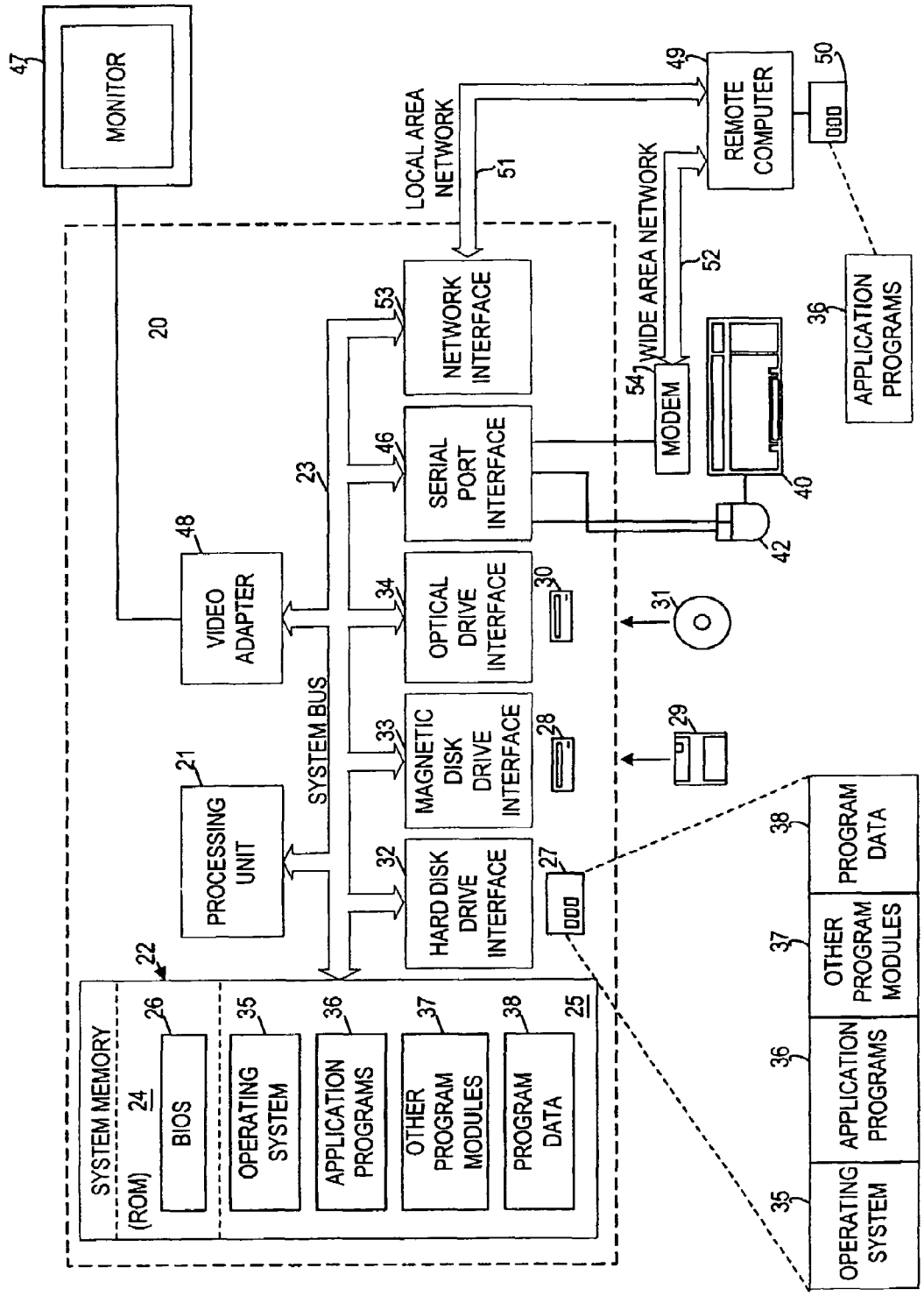
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer, including a processing unit 21, a system memory 22, and a system bus 23 that operatively couples various system components include the system memory to the processing unit 21. There may be only one or there may be more than one processing unit 21, such that the processor of computer comprises a single central-processing unit (CPU), or a plurality of processing units, commonly referred to as a parallel processing environment. The computer may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM). A basic input/output system (BIOS) 26, containing the basic routines that help to transfer information between elements within the computer, such as during start-up, is stored in ROM 24. The computer further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM, including an operating system 35, one or more application programs 36, other program modules 37, and program data 38. A user may enter commands and information into the personal computer through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer may operate in a networked environment using logical connections to one or more remote computers, such as remote computer 49. These logical connections are achieved by a communication device coupled to or a part of the computer; the invention is not limited to a particular type of communications device. The remote computer 49 may be another computer, a server, a router, a network PC, a client, a peer device or other common network node, and typically includes many or all of the elements described above relative to the computer, although only a memory storage device has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer is connected to the local network 51 through a network interface or adapter 53, which is one type of communications device. When used in a WAN-networking environment, the computer typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer, or portions thereof, may be stored in the remote memory storage device. It is appreciated that the network connections shown are exemplary and other means of and communications devices for establishing a communications link between the computers may be used.

Cluster-based Web Traffic Visualization Techniques

In this section of the detailed description, various approaches and techniques for visualizing web site activity in a cluster-based manner are described. In the diagram of FIG. 2, for instance, on the display device 200 a series of windows 202a, 202b, 202c, . . . , 202d, 202m and 202n is shown. Each of the series of windows corresponds to a cluster into which users of a given web site or web sites have been partitioned based on similar web browsing behavior through the site(s). A cluster is generally defined in a non-restrictive and a non-limiting manner herein as a group of like items that have been associated with one another based on one or more common or similar characteristics via a predetermined technique. For example, in one embodiment of the invention, an Expectation Maximization (EM) approach is used, as known within the art, to yield a mixture model of first-order Markov models, as also known within the art, where each cluster has a corresponding first-order Markov model. In another embodiment, an Expectation Maximization (EM) approach is used, as known within the art, to yield a mixture model of zero-order Markov models, as also known within the art, where each cluster has a corresponding zero-order Markov model. However, the invention is not so limited. The windows are desirably ordered from the cluster having the greatest number of users therein to the cluster having the least number of users therein. Each of the windows can desirably be increased in size, also known as maximized, so that more rows of the window is shown on the device 200. Furthermore, desirably each of the windows can have scroll bars added thereto, as known within the art, so that the data within the window is navigable via the bars.

Figure 3:
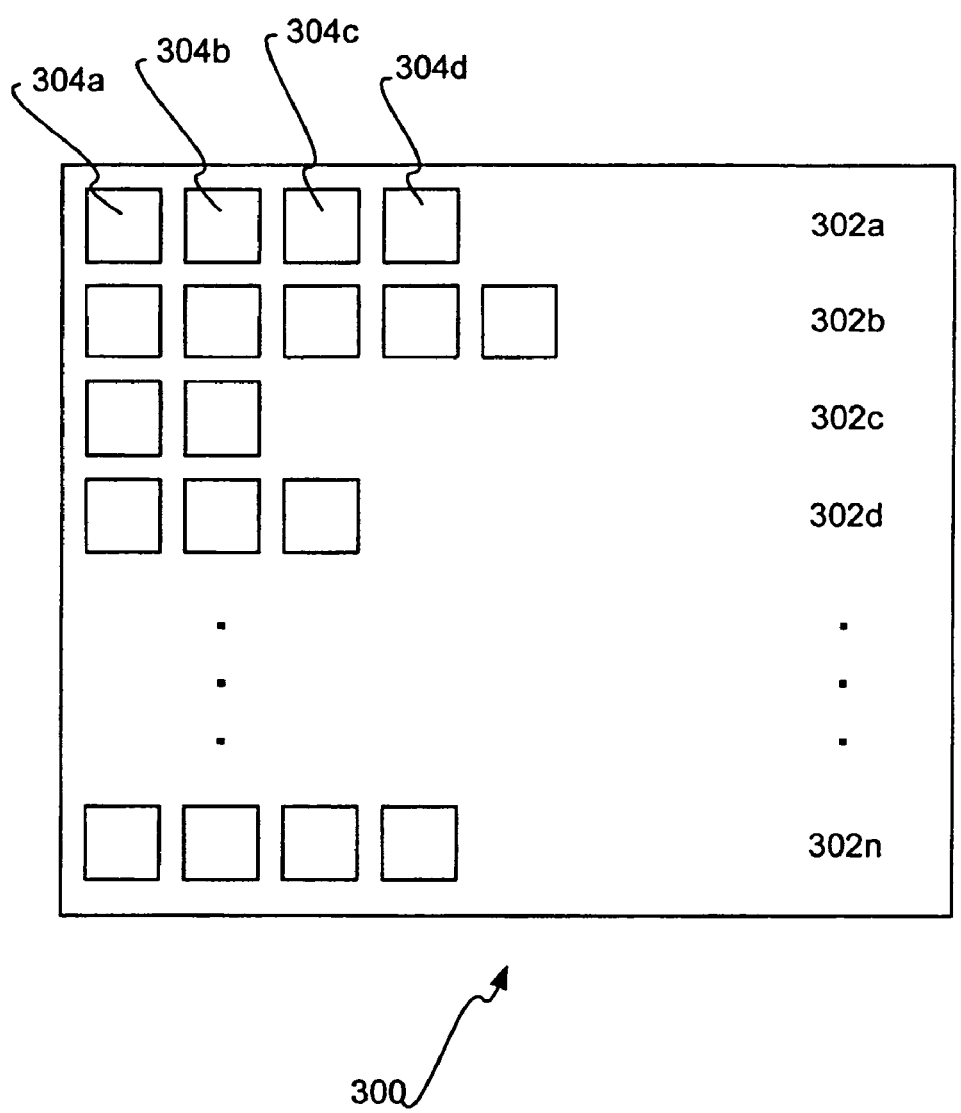
FIG. 3 is a diagram of a representative such window in accordance with an embodiment of the invention.

In the diagram of FIG. 3, a representative window 300, that could be any of the series of windows, is shown. The window has at least one row, such as the rows 302a, 302b, 302c, 302d, . . . , 302n. Each row corresponds to a particular session of a particular user, where the sessions of the users in a given cluster are grouped together based on similar web browsing behavior. Each row has an ordered number of visible units, such as, in one embodiment, blocks, although the invention is not so limited. As an example, the row 302a has ordered blocks 304a, 304b, 304c and 304d. Each of the ordered visible units of a row represents a page of the web site visited by the user of the row. For example, the row 302a indicates that in this session, a user has visited four pages of a site.

Desirably, the visible units are coded, such as by color, to indicate the different types of pages on the site. The types of web pages are referred to herein synonymously as the different parts of the site that can be visited by the user. Thus, for example, for a news-related web site, the visible units may be color coded as to the particular parts of the site, such as local news encompassing local news-related pages, global news encompassing global news-related pages, financial news encompassing financial news-related pages, sports news encompassing sports news-related pages, entertainment news encompassing entertainment news-related pages, etc. Thus, the path of a given user session within a given cluster through a web site can easily be determined via examination of the number and order of the visible units, as well as their color. Furthermore, in one embodiment, the rows within a window can be ordered based on a predetermined typicality measure of the users to which the rows correspond. In one embodiment, the predetermined measure is the probability of behavior based on location within a cluster, or, p(behavior|cluster).

Figure 4:
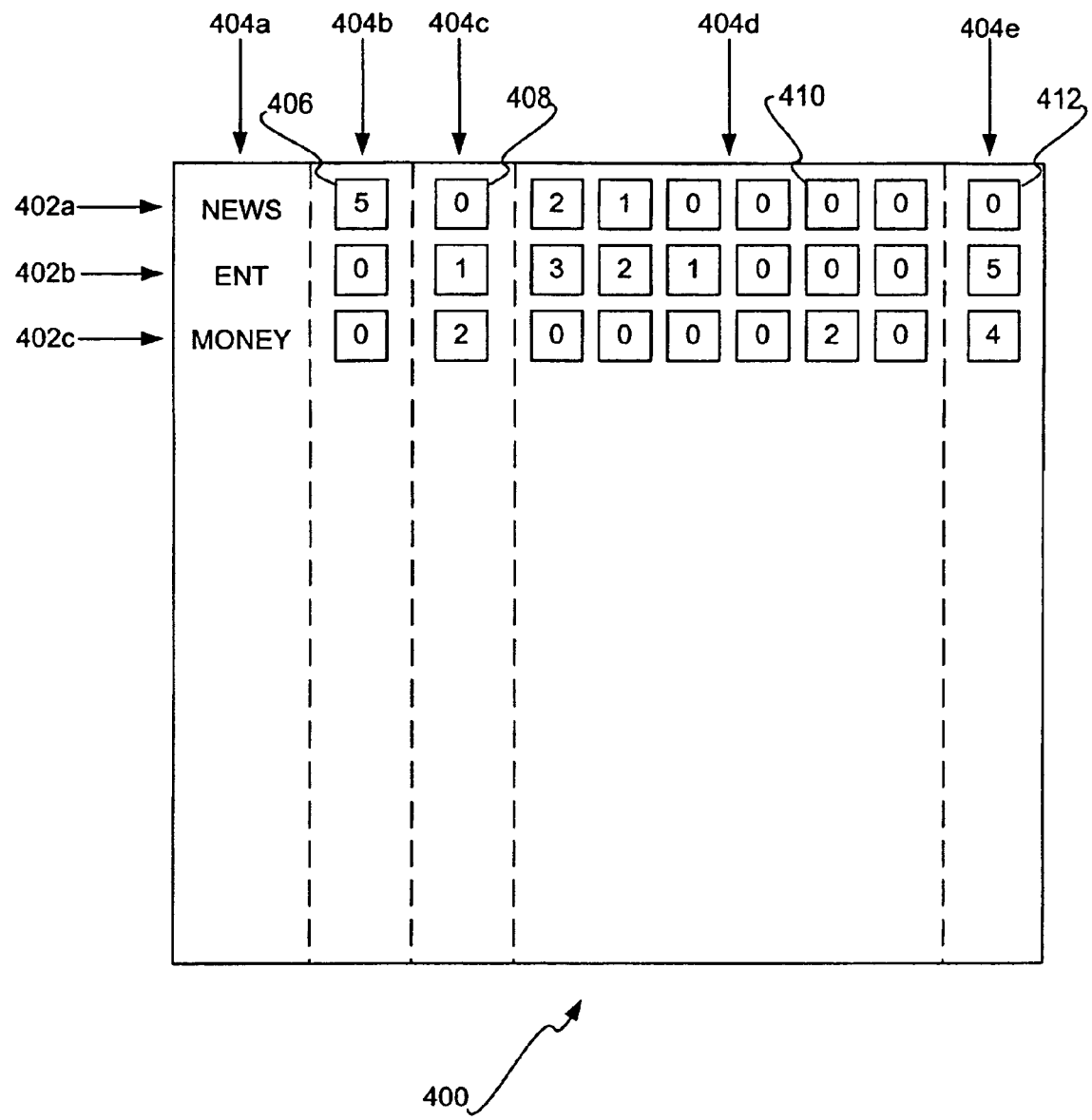
FIG. 4 is a diagram of a window showing a corresponding model for a cluster, according to an embodiment of the invention.

As has been described, in one embodiment, each cluster to which a window corresponds has a corresponding first-order Markov model. Therefore, in one embodiment, a selected window or windows, or all the windows, can be made to display the corresponding Markov model(s) for these window(s), in lieu of the ordered rows corresponding to user sessions of a web site. This is shown in FIG. 4. In the window 400, there is a series of rows, such as the rows 402a, 402b and 402c. Each row corresponds to a different type of web page on the site(s) that can be visited by the user. This is also synonymously referred to herein as a different part of the site(s) that can be visited by the user. It is noted that only three rows are shown in the window 400 for sake of illustrative clarity. The rows are divided into a number of columns, such as the columns 404a, 404b, 404c, 404d and 404e. Each row has a label corresponding to a type of web page in the first column 404a. Thus, the row 402a has the label news, encompassing news-related web pages of the site(s), the row 402b has the label ent, for entertainment, encompassing entertainment-related web pages of the site(s), the row 402c has the label money, encompassing money- or finance-related web pages of the site(s), etc.

Each row has in the columns 404b, 404c, 404d and 404e one or more visible units, such as blocks, that indicate a value by their shading intensity. In the diagram of FIG. 4, however, the shading intensity is indicated as a number from 0 to 5 within a block, where 0 indicates dark, and 5 indicates light. Thus, the block 406 has an intensity level 5, the block 408 has an intensity level 0, the block 410 has an intensity level 0, and the block 412 has an intensity level 0, etc. This nomenclature is for illustrative clarity only, however, and the invention is not so limited. Furthermore, the number of different intensity levels is also not limited by the invention.

Each row has in the column 404b a visible unit that has an intensity level indicating the frequency with which users visit that part of the site, or type of web page on the site, represented by the row. In one embodiment, this is the probability of visiting that type of web page on the site conditioned on inclusion in the cluster represented by the window, or, p(part|cluster). For example, the block 406 of the row 402a has the maximum intensity level of 5, indicating that this probability is high. Each row also has in the column 404c a visible unit that has an intensity level indicating the frequency with which a user's first visit is to the part of the site represented by the row. For example, the block 408 of the row 402a has the minimum intensity level of 0, indicating that users within this cluster are not likely to visit this part of the site—that is, this type of web page of the site—first.

Furthermore, each row has in the column 404d a number of visible units that have intensity levels indicating the transition probabilities of the first-order Markov model, such as p(part i at time t+1, p part j at time t), etc., as can be appreciated by those of ordinary skill within the art. Alternatively, the conditional transition probabilities, p(part i at time t+1|p part j at time t) can be indicated by the visible units within the column 404d. Finally, each row has in the column 404e a visible unit that has an intensity level indicating the probability at which the user leaves the site from that part of the site, or type of web page on the site, represented by the row. For example, the block 412 of the row 402a has the minimum intensity level of 0, indicating that users within the cluster represented by the window 400 are unlikely to leave the web site from the part of the site represented by the row 402a.

Methods and Systems

In this section of the detailed description, methods and systems according to varying embodiments of the invention are described. In some embodiments, the methods in particular are computer-implemented. The computer-implemented methods can be realized at least in part as one or more programs running on a computer—that is, as a program executed from a computer-readable medium such as a memory by a processor of a computer, such as the computer shown in and described in conjunction with FIG. 1. The programs are desirably storable on a machine-readable medium such as a floppy disk or a CD-ROM, for distribution and installation and execution on another computer.

Figure 5:
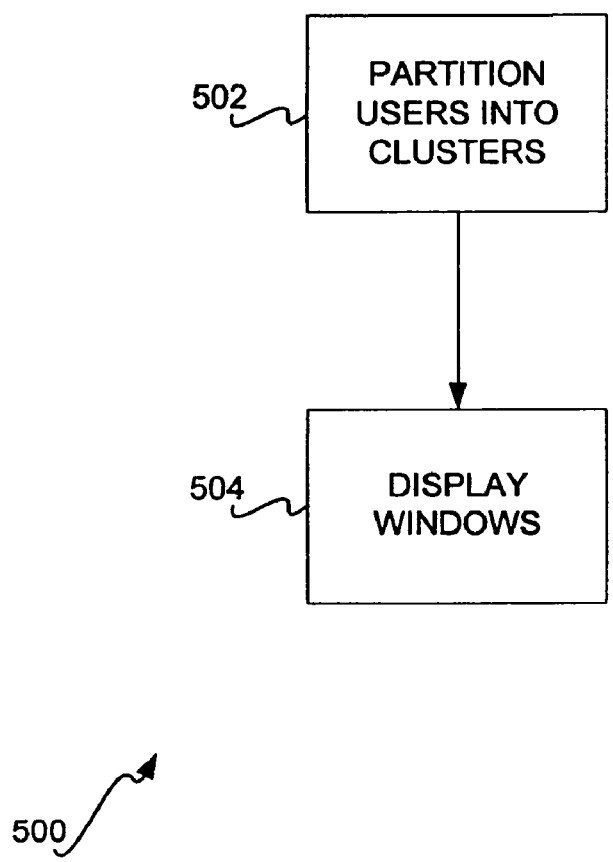
FIG. 5 is a flowchart of a method according to an embodiment of the invention; and, FIG. 6 is a diagram of a system according to an embodiment of the invention.

Referring to FIG. 5, a flowchart of a method 500 according to an embodiment of the invention is shown. In 502, users are partitioned into clusters, based on similar web browsing behavior thereof, as has been described in the previous section of the detailed description. In 504, windows are displayed on a display device that correspond to the clusters, in a manner consistent with as has also been described in the previous section of the detailed description.

Figure 6:
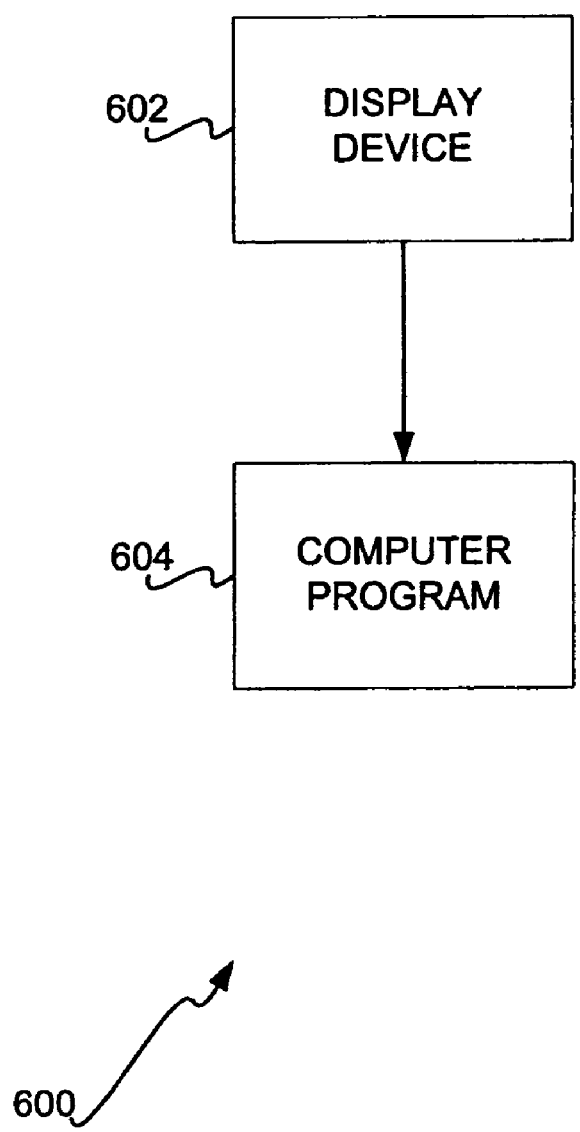

Referring next to FIG. 6, a diagram of a system 600 according to an embodiment of the invention is shown. The system 600 can in one embodiment be implemented within the operating environment described previously in the detailed description in conjunction with FIG. 1. The system 600 includes a display device 602 and a computer program 604. The device 602 can be a computer monitor, such as a flat-panel display (FPD) or a cathode-ray tube (CRT) display, as known within the art, in one embodiment. The program 604 is designed to display windows on the device 602 corresponding to clusters into which users have been partitioned based on similar browsing behavior of the users, as has been described in the previous section of the detailed description. In one embodiment, the program 604 can be considered the means for accomplishing this functionality. Furthermore, the program 604 can be executed from a computer-readable medium, such as a hard disk drive or a memory, by a processor in one embodiment.

CONCLUSION

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A system that visualizes web site activity traffic, comprising:
program modules embodied on a computer-readable storage medium, the program modules including the following components:
a monitoring component that obtains information related to browsing activity of users visiting a web site;
a component that analyzes the information and parses the users into one or more user groups based on the analyzed information; and
a visualization component that graphically presents user browsing information in one or more windows within a display screen, the one or more windows corresponding to the one or more user groups, respectively, and the browsing information being displayed within a window corresponding to the user group associated with the window, the browsing information within the window being delineated by user into one or more rows such that each row corresponds to an individual user, the one or more rows ordered according to a probability of a behavior based on a location of a user within a group.

2. The system of claim 1, the groups being defined via a non-restrictive and/or a non-limiting set of similar items that are associated with one another based on one or more common or similar characteristics.

3. The system of claim 1, the one or more rows comprising one or more units that store information associated with web pages visited by the users.

4. The system of claim 3, the respective units within a row being color coded according to a type of web page represented.

5. The system of claim 4, the type representing one or more of local news, global news, financial news, and entertainment.

6. The system of claim 3, the respective units being associated with intensity levels that indicate a frequency with which a user visits a type of web page.

7. The system of claim 6, the frequency comprising a probability of visiting a type of web page.

8. The system of claim 6, the intensity levels ranging from low to high, a low intensity indicating a low probability of visiting a web page and a high intensity indicating a high probability of visiting the web page.

9. The system of claim 1, the respective rows being associated with an intensity level that indicates a conditional transition probability of a zero-order or a first-order Markov model.

10. The system of claim 1, the respective rows being associated with labels that correspond to a type of web page represented by the row.

11. The system of claim 1, the windows being sorted by a number of users within the group associated with the windows.

12. The system of claim 1, the component utilizing an expectation-maximization (EM) algorithm to facilitate generating the groups.

13. The system of claim 1, the respective windows being configured to change size to display more rows within a visible region of the windows.

14. The system of claim 1, the respective windows including a scroll bar that is utilized to navigate through the rows data displayed within the windows.

15. A method that displays web traffic, comprising:
receiving web site user clusters that were generated through one of zero-order and first-order Markov models, respective clusters including information related to one or more web pages accessed by one or more users who display similar web browsing characteristics;
creating individual graphical user interfaces for each cluster;
visualizing the cluster information within one or more rows of an associated graphical user interface; and
sorting the one or more rows according to a probability of a behavior based on a location of a user within a cluster.

16. The method of claim 15, further comprising defining the clusters with a non-restrictive and a non-limiting group of associated items.

17. The method of claim 15, further comprising delineating the one or more rows into one or more units that respectively store the web page information.

18. The method of claim 17, further comprising employing a color code with the units to differentiate respective units according to a type of web page represented.

19. A method for displaying web site user activity according to web site behavior, comprising:
utilizing an expectation-maximization algorithm to cluster web site users by browsing behavior;
displaying user web site activity by visualizing information related to web pages accessed by users with similar behavior in fields displayed within a window; and
employing different intensity levels with respective fields to indicate a probability of visiting a type of web page.

20. The method of claim 19, further comprising labeling respective fields by a type of web page represented.

21. The method of claim 20, the type representing one or more of local news, global news, financial news, and entertainment.

22. The system of claim 19, further comprising ordering the windows by a number of users within a cluster.

23. A data packet embodied on a computer-readable storage medium that when transmitted between two or more computer components that facilitates visualizing web site activity, comprising:

a plurality of clusters that respectively include users with similar browsing behavior and web pages visited by the users, wherein the information within the plurality of clusters is displayed in windows, based on respective clusters, of a display and the web page information is partitioned into rows within the windows such that each row is associated with an individual user, the one or more rows ordered according to a probability of a behavior based on a location of a user in a cluster.

24. A computer readable medium storing computer executable components that facilitates visualizing web site activity, comprising:

a component that partitions web site users according to similar web site navigation;

a component that generates a window for each partition within a display;

a component that displays information relating to web pages visited by the users in associated windows; and a component that sorts the web pages information within fields of a plurality of rows that respectively correspond to individual users, the fields displayed employing different intensity levels to indicate a probability of a user visiting a type of web page, the intensity levels ranging from low to high, a low intensity indicating a low probability of visiting the web page, and a high intensity indicating a high probability of visiting the web page.

25. A system that facilitates visualization web site activity, the system comprising program modules embodied on a computer-readable storage medium that facilitate:

means for clustering web site activity information according to web site user behavior;

means for displaying the clustered web site activity information in respective windows;

means for presenting the web site activity information within respective windows based on similar user browsing behavior; and means for delineating the web site activity information into one or more rows within the respective windows, each row represents an individual user of the web site, the respective rows associated with an intensity level indicating a conditional transition probability of a zero-order or a first-order Markov model.

* * * * *